US012594850B2

(12) United States Patent
Hair et al.

(10) Patent No.: US 12,594,850 B2
(45) Date of Patent: Apr. 7, 2026

(54) SYSTEMS AND METHODS FOR PRIORITIZING VEHICLE CHARGING USING ENERGY FROM RENEWABLE OR LOW CARBON EMISSION SOURCES

(71) Applicant: FORD GLOBAL TECHNOLOGIES, LLC, Dearborn, MI (US)

(72) Inventors: Jonathan Hair, Northville, MI (US); Michael Alan McNees, Flat Rock, MI (US); Brendan Diamond, Grosse Pointe, MI (US); Andrew Denis Lewandowski, Sterling Heights, MI (US); Lars Niklas Pettersson, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 741 days.

(21) Appl. No.: 17/936,891

(22) Filed: Sep. 30, 2022

(65) Prior Publication Data

US 2024/0109450 A1 Apr. 4, 2024

(51) Int. Cl.
| | |
|---|---|
| *H02J 7/00* | (2006.01) |
| *B60L 53/00* | (2019.01) |
| *B60L 53/51* | (2019.01) |
| *B60L 53/63* | (2019.01) |
| *B60L 53/64* | (2019.01) |
| *B60L 53/68* | (2019.01) |
| *B60L 55/00* | (2019.01) |
| *G06Q 10/0631* | (2023.01) |

(Continued)

(52) U.S. Cl.
CPC .............. *B60L 53/63* (2019.02); *B60L 53/00* (2019.02); *B60L 53/51* (2019.02); *B60L 53/64* (2019.02); *B60L 53/68* (2019.02); *B60L 55/00*

(2019.02); *G06Q 10/0631* (2013.01); *H02J 7/0071* (2020.01); *B60L 50/60* (2019.02); *B60L 53/50* (2019.02); *B60L 53/52* (2019.02)

(58) Field of Classification Search
CPC .......... B60L 53/63; B60L 53/00; B60L 53/51; B60L 53/64; B60L 53/68; B60L 53/50; B60L 53/52; B60L 55/00; B60L 50/60; G06Q 10/0631; H02J 7/0071
USPC .................................... 320/101, 109; 701/22
See application file for complete search history.

(56) References Cited

U.S. PATENT DOCUMENTS

| | | | |
|---|---|---|---|
| 9,024,571 | B2 | 5/2015 | Uyeki |
| 10,005,371 | B2 | 6/2018 | Reineccius et al. |

(Continued)

*Primary Examiner* — Zixuan Zhou
(74) *Attorney, Agent, or Firm* — David B. Kelley; Carlson, Gaskey & Olds, P.C.

(57) ABSTRACT

Systems and methods are disclosed for prioritizing vehicle charging using energy from renewable/low carbon emission energy sources over non-renewable/high carbon emission energy sources. The proposed systems and methods allow users to identify when to charge their vehicles and/or when to provide energy from their vehicles to other structures based on a currently available energy source mixture and in a manner that minimizes the impact to the environment. In-vehicle connectivity may be utilized to obtain real-time grid information, and a charging schedule may then be created that intelligently prioritizes charging during times when an energy mixture percentage available from renewable/low carbon emission sources exceeds a predefine threshold or when a real-time emissions level is below a predefined threshold.

20 Claims, 5 Drawing Sheets

(51) Int. Cl.
| | | |
|---|---|---|
| *B60L 50/60* | (2019.01) | |
| *B60L 53/50* | (2019.01) | |
| *B60L 53/52* | (2019.01) | |

(56) References Cited

U.S. PATENT DOCUMENTS

| | | | |
|---|---|---|---|
| 10,121,158 B2 | 11/2018 | Yardhan et al. | |
| 11,041,734 B2 | 6/2021 | Cyr et al. | |
| 2014/0222698 A1 | 8/2014 | Potdar et al. | |
| 2021/0245620 A1 | 8/2021 | Loveall et al. | |
| 2024/0010099 A1* | 1/2024 | Peterman | ............... G06Q 10/04 |

* cited by examiner

SYSTEMS AND METHODS FOR PRIORITIZING VEHICLE CHARGING USING ENERGY FROM RENEWABLE OR LOW CARBON EMISSION SOURCES

TECHNICAL FIELD

This disclosure relates generally to the field of electrified vehicle charging, and more particularly to vehicle charging systems and methods designed for prioritizing charging using energy from renewable/low carbon emission energy sources.

BACKGROUND

Plug-in type electrified vehicles include one or more charging interfaces for charging a traction battery pack. Plug-in vehicles are typically charged while parked at a charging station or some other utility power source. The traction battery pack must per periodically recharged to replenish the energy levels necessary for achieving vehicle propulsion. Many plug-in vehicle owners are environmentally conscious.

SUMMARY

A vehicle charging system according to an exemplary aspect of the present disclosure includes, among other things, a traction battery pack and a control module programmed to prepare an ECO charging schedule for charging the traction battery pack. The ECO charging schedule prioritizes using energy from renewable/low carbon emission energy sources over non-renewable/high carbon emission energy sources for charging the traction battery pack.

In a further non-limiting embodiment of the foregoing vehicle charging system, the ECO charging schedule identifies a time when a real-time energy mixture from the renewable/low carbon energy sources exceeds a predefined renewable energy threshold for charging the traction battery pack.

In a further non-limiting embodiment of either of the foregoing vehicle charging systems, the predefined renewable energy threshold is derived from a user-selected ECO charging mode setting.

In a further non-limiting embodiment of any of the foregoing vehicle charging systems, the real-time energy mixture is derived from grid data received from a cloud-based server system.

In a further non-limiting embodiment of any of the foregoing vehicle charging systems, the ECO charging schedule identifies a time when a real-time emission rate of a grid power source is less than a predefined maximum acceptable emission rate threshold for charging the traction battery pack.

In a further non-limiting embodiment of any of the foregoing vehicle charging systems, the predefined maximum acceptable emission rate threshold is derived from a user-selected ECO charging mode setting.

In a further non-limiting embodiment of any of the foregoing vehicle charging systems, the real-time emission rate is derived from grid data received from a cloud-based server system.

In a further non-limiting embodiment of any of the foregoing vehicle charging systems, the control module is further programmed to determine a real-time emission rate and a long term average emission rate of a grid power source as part of preparing the ECO charging schedule.

In a further non-limiting embodiment of any of the foregoing vehicle charging systems, the real-time emission rate and the long term average emission rate are derived from grid data obtained from a cloud-based server system.

In a further non-limiting embodiment of any of the foregoing vehicle charging systems, the control module is a component of a motor vehicle that is powered by the traction battery pack.

In a further non-limiting embodiment of any of the foregoing vehicle charging systems, the ECO charging schedule identifies when the traction battery pack cannot be charged to a predefined vehicle range threshold before a desired departure time.

In a further non-limiting embodiment of any of the foregoing vehicle charging systems, the control module is further programmed to control charging of the traction battery pack without prioritizing energy from the renewable/low carbon emission energy sources when the traction battery pack cannot be charged to the predefined vehicle range threshold before the desired departure time.

In a further non-limiting embodiment of any of the foregoing vehicle charging systems, the predefined vehicle range threshold and the desired departure time are derived from a user-selected ECO charging mode setting.

A vehicle charging system according to another exemplary aspect of the present disclosure includes, among other things, a traction battery pack, and a control module programmed to prioritize charging of the traction battery pack when a real-time energy mixture from renewable/low carbon energy sources exceeds a predefined renewable energy threshold or when a real-time emission rate of a grid power source is less than a predefined maximum acceptable emission rate threshold.

In a further non-limiting embodiment of the foregoing vehicle charging system, the control module is further programmed to determine whether the traction battery pack can be charged to a predefined vehicle range threshold before a desired departure time.

In a further non-limiting embodiment of either of the foregoing vehicle charging systems, the control module is further programmed to command charging of the traction battery pack irrespective of the real-time energy mixture or the real-time emission rate when the traction battery pack cannot be charged to the predefined vehicle range threshold before the desired departure time.

In a further non-limiting embodiment of any of the foregoing vehicle charging systems, the real-time energy mixture and the real-time emission rate are derived from grid data received from a cloud-based server system.

In a further non-limiting embodiment of any of the foregoing vehicle charging systems, the predefined renewable energy threshold and the predefined maximum acceptable emission rate threshold are derived from a user-selected ECO charging mode setting.

In a further non-limiting embodiment of any of the foregoing vehicle charging systems, the control module is further programmed to control the traction battery pack to power a residential structure when the real-time energy mixture available from the grid power source is below the predefined renewable energy threshold or when the real-time emission rate of the grid power source is greater than the predefined maximum acceptable emission rate threshold.

A method according to another exemplary aspect of the present disclosure includes, among other things, controlling charging of a traction battery pack of a vehicle based on an ECO charging schedule created by a control module of a vehicle charging system. The ECO charging schedule prioritizes a use of energy from renewable/low carbon emission energy sources over non-renewable/high carbon emission energy sources.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
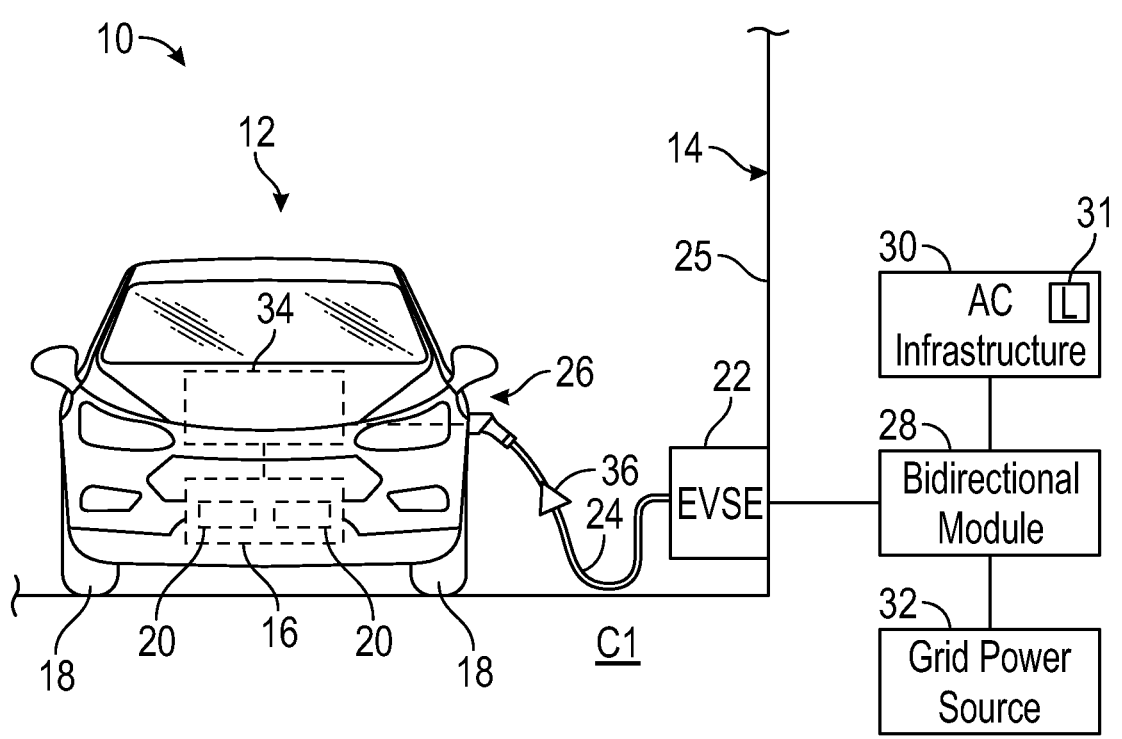
FIG. 1 schematically illustrates a first energy transfer configuration of an electrified vehicle.
Figure 2:
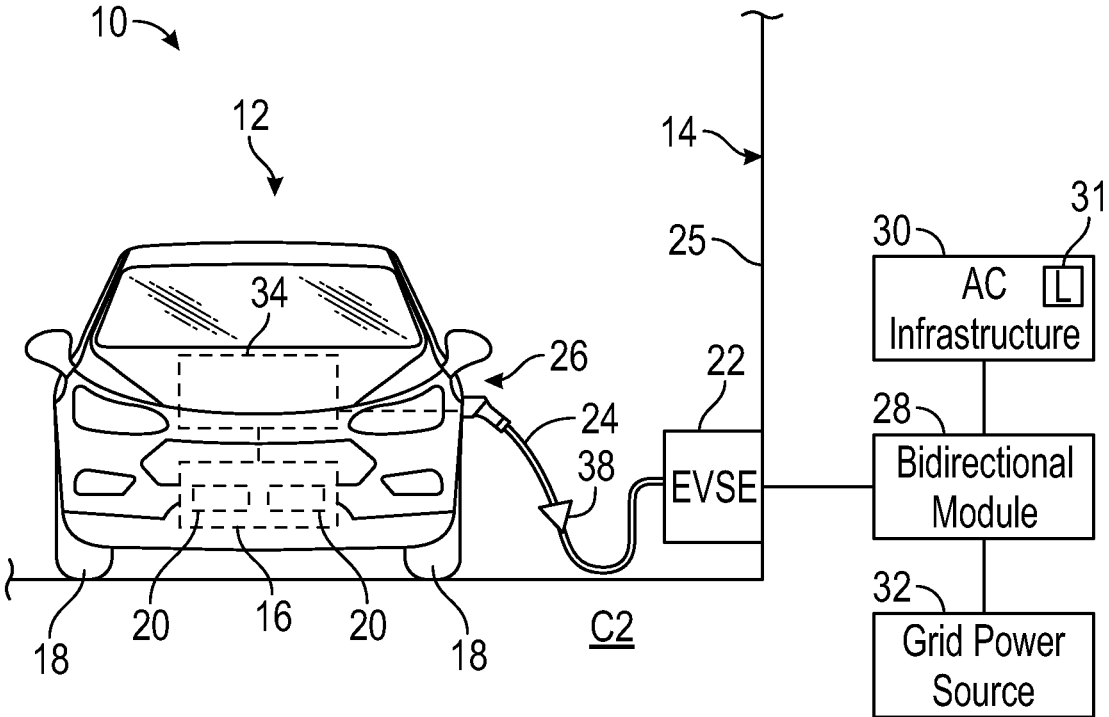
FIG. 2 illustrates a second energy transfer configuration of the electrified vehicle of FIG. 1.

This disclosure relates to systems and methods for prioritizing vehicle charging using energy from renewable/low carbon emission energy sources over non-renewable/high carbon emission energy sources. The proposed systems and methods allow users to identify when to charge their vehicles and/or when to provide energy from their vehicles to other structures based on a currently available energy source mixture and in a manner that minimizes the impact to the environment. In-vehicle connectivity may be utilized to obtain real-time grid information, and a charging schedule may then be created that intelligently prioritizes charging during times when an energy mixture percentage available from renewable/low carbon emission sources exceeds a predefine threshold or when a real-time emissions level is below a predefined threshold. These and other features of this disclosure are discussed in greater detail in the following paragraphs of this detailed description FIGS. 1 and 2 schematically illustrate an exemplary bidirectional energy transfer system 10 (hereinafter "the system 10") for bidirectionally transferring energy between a vehicle 12 and a structure 14. The system 10 enables the bidirectional transfer of energy from the vehicle 12 to the structure 14 and vice versa. The structure 14 may be a residential building, a commercial building, a parking garage, a charging station, or any other type of structure that is capable of receiving or transferring energy. In an embodiment, the structure 14 is a residential household that functions as a "home location" of the vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component.

In an embodiment, the vehicle 12 is a plug-in type electric vehicle (e.g., a plug-in hybrid electric vehicle (PHEV) or a battery electric vehicle (BEV)). The vehicle 12 includes a traction battery pack 16 that is part of an electrified powertrain capable of applying a torque from an electric machine (e.g., an electric motor) for driving drive wheels 18 of the vehicle 12. Therefore, the electrified powertrain of the vehicle 12 may electrically propel the set of drive wheels 18 either with or without the assistance of an internal combustion engine.

The vehicle 12 of FIGS. 1-2 is schematically illustrated as a car. However, other vehicle configurations are also contemplated. The teachings of this disclosure may be applicable for any type of vehicle as the vehicle 12. For example, the vehicle 12 could be configured as a car, a truck, a van, a sport utility vehicle (SUV), etc.

Although shown schematically, the traction battery pack 16 may be configured as a high voltage traction battery pack that includes a plurality of battery arrays 20 (e.g., battery assemblies or groupings of battery cells) capable of outputting electrical power to one or more electric machines of the vehicle 12. Other types of energy storage devices and/or output devices may also be used to electrically power the vehicle 12.

The vehicle 12 may interface with the structure 14 through an electric vehicle supply equipment (EVSE) 22 in order to perform bidirectional energy transfers of the system 10. In an embodiment, the EVSE 22 is a wall box that may be mounted to a wall 25 of the structure 14. A charge cable 24 may operably connect the EVSE 22 to a charge port assembly 26 of the vehicle 12 for transferring energy between the vehicle 12 and the structure 14. The charge cable 24 may be configured to provide any level of charging (e.g., 120 VAC, 240 VAC, Direct Current (DC) charging, etc.).

The EVSE 22 may be operably connected to an AC infrastructure 30 of the structure 14 through a bidirectional energy transfer module 28. Although shown separately from the EVSE 22 in FIG. 1, the bidirectional energy transfer module 28 and the EVSE 22 could be integrated together as part of common module.

Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, furnaces, home alarms systems, sump pump systems, routers, etc.

Power from a grid power source 32 (e.g., AC power, solar power, wind power, etc., or combinations thereof) and/or power from the vehicle 12 may be selectively transferred through the bidirectional energy transfer module 28. The bidirectional energy transfer module 28 is configured to aid the bidirectional transfers of electrical energy between the vehicle 12 and the structure 14. The bidirectional energy transfer module 28 may include various equipment, including but not limited to an AC/DC converter, a common HVDC bus, an isolation transformer, a DC/DC converter, a control module, etc. for configuring the structure 14 to either receive electrical energy from the vehicle 12 for supporting the electrical loads 31 or send electrical energy to the vehicle 12 for charging the traction battery pack 16. The bidirectional energy transfer module 28 may further be configured to transfer energy from the grid power source 32 to the AC infrastructure 30.

The vehicle 12 may include a vehicle power transfer system 34 configured for further enabling the bidirectional transfer of power between the vehicle 12 and the structure 14. The vehicle power transfer system 34 may be operably connected between the charge port assembly 26 and the traction battery pack 16 of the vehicle 12. The vehicle power transfer system 34 may include various equipment, such as a charger, a converter, HV relays or contactors, a motor controller (which may be referred to as an inverter system controller or ISC), etc. for configuring the vehicle 12 for either receiving electrical energy from the structure 14 or communicating electrical energy to the structure 14. The vehicle power transfer system 34 may additionally be configured to transfer energy between the traction battery pack 16 and one or more electric motors of the vehicle 12.

One non-limiting example of a suitable vehicle power transfer system that may be employed for use within the vehicle 12 for achieving bidirectional power transfers is disclosed within US Patent Publication No. 2020/0324665, assigned to Ford Global Technologies, LLC, the disclosure of which is incorporated herein by reference. However, other power transfer systems could also be utilized for achieving the bidirectional power transfers within the scope of this disclosure.

FIG. 1 schematically illustrates a first configuration C1 of the system 10. During the first configuration C1, power may be transferred from the structure 14 to the vehicle 12, such as for charging the traction battery pack 16 of the vehicle 12. The direction of energy transfer during the first configuration C1 is schematically depicted by arrow 36.

FIG. 2 schematically illustrates a second configuration C2 of the system 10. During the second configuration C2, power may be transferred from the traction battery pack 16 of the vehicle 12 to the structure 14. The direction of energy transfer during the second configuration C2 is schematically illustrated by arrow 38. In this way, the vehicle 12 may be employed as a backup energy storage system for powering the electrical loads 31 of the structure 14, such as when power from the grid power source 32 is temporarily unavailable as a result of electrical blackouts or when the renewable or low carbon emission energy mixture available from the grid power source 32 is below a certain threshold, for example.

The owner/user of the vehicle 12 may consider themselves to be an environmentally conscious person. The owner/user may therefore wish to charge the vehicle 12 in ways that are as environmentally friendly as possible. However, electrified vehicle owners have traditionally not been able to accurately quantify and minimize carbon emissions when charging their vehicles. This disclosure is therefore directed to systems and methods for prioritizing charging of the vehicle 12 during times in which energy contributions from renewable/low carbon emission energy sources are relatively high and therefore more environmentally friendly.

Figure 3:
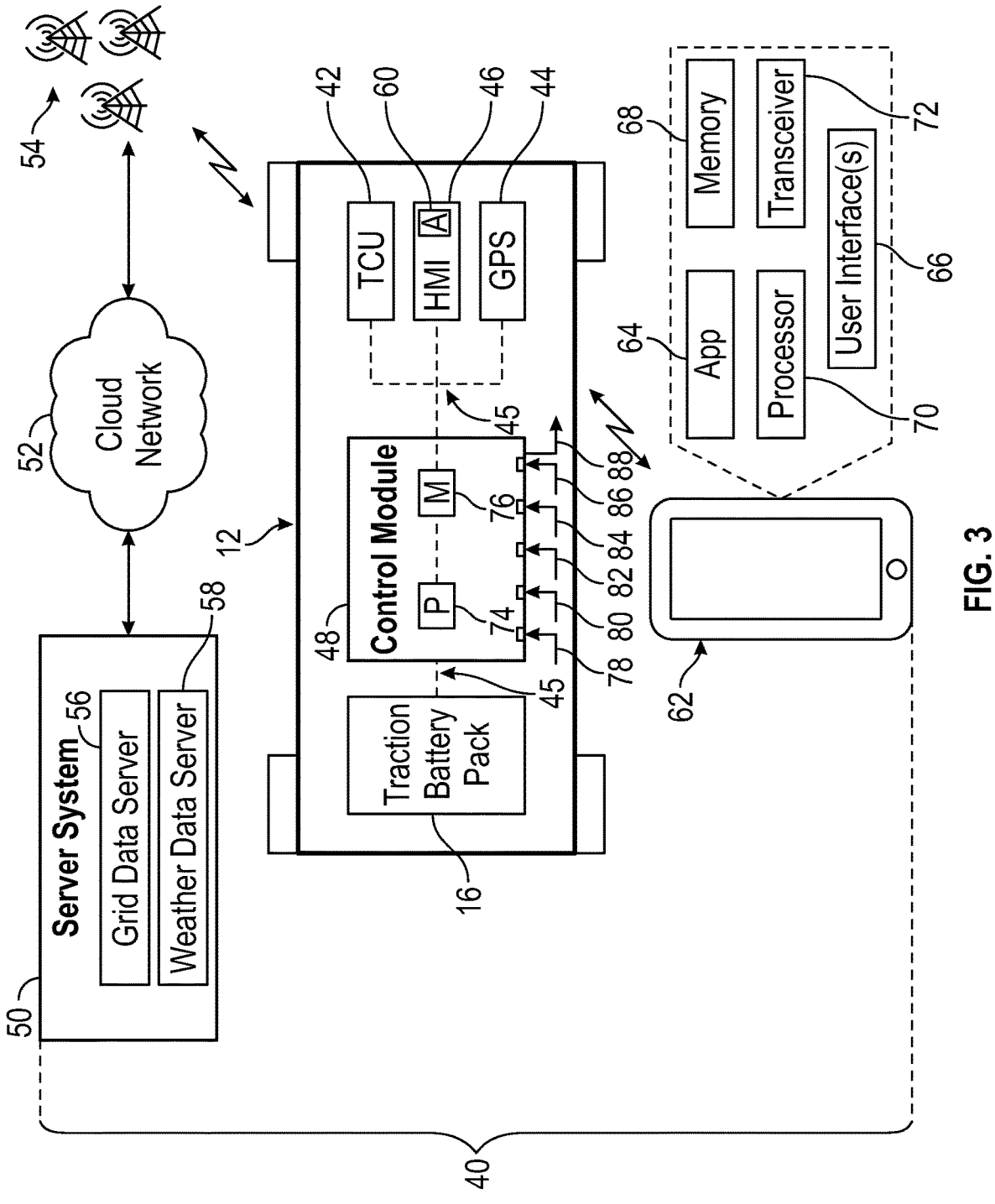
FIG. 3 schematically illustrates a vehicle charging system of the vehicle of FIGS. 1 and 2.

FIG. 3, without continued reference to FIGS. 1 and 2, is a highly schematic depiction of a vehicle charging system 40 of the vehicle 12. The vehicle charging system 40 may be configured provide an economy or "ECO" charging mode to prioritize charging of the traction battery pack 16 during times in which the amount of energy available from renewable or low carbon emission sources (e.g., hydro, solar, wind, nuclear, etc.) exceeds a predefined threshold or when a real-time emissions level of the grid power source 32 is below a predefined threshold. The vehicle charging system 40 may therefore allow the user to quantify and minimize carbon emissions when charging the vehicle 12.

As part of the vehicle charging system 40, the vehicle 12 may include a telecommunications module 42, a global positioning system (GPS) 44, a human machine interface (HMI) 46, and a control module 48. These and other components may be interconnected and in electronic communication with one another over one or more communication buses 45. The communication buses 45 may be wired communication buses such as a controller area network (CAN) bus, or a wireless communication buses such as Wi-Fi, Bluetooth®, Ultra-Wide Band (UWB), etc.

The telecommunications module 42 may be configured for achieving bidirectional communications with a cloud-based server system 50. The telecommunications module 42 may communicate over a cloud network 52 (e.g., the internet) to obtain various information stored on the server system 50 or to provide information to the server system 50 that can subsequently be accessed by the vehicle 12 (and/or other participating users). The server system 50 can identify, collect, and store user data associated with the vehicle 12 for validation purposes. Upon an authorized request, data may be subsequently transmitted to the telecommunications module 42 via one or more cellular towers 54 or some other known communication technique (e.g., Wi-Fi, Bluetooth®, data connectivity, etc.). The telecommunications module 42 can receive data from the server system 50 or can communicate data back to the server system 50 via the cellular tower(s) 54. Although not necessarily shown or described in this highly schematic embodiment, numerous other components may enable bidirectional communications between the vehicle 12 and the server system 50.

The server system 50 may include various servers that store data that may be accessed by the vehicle charging system 40 in anticipation of preparing a ECO charging schedule 88 that prioritizes charging using energy from renewable/low carbon emission sources. In an embodiment, the server system 50 includes a grid data server 56. The grid data server 56 may store data related to the grid power source 32. For example, the grid-related data could include an identification of the energy sources (e.g., coal, natural gas, nuclear, wind turbine, solar, hydro, etc.) that contribute to energy production at the grid power source 32, real-time energy contributions of each energy source relative to a total energy production of the grid power source 32, emission rates (e.g., emissions per unit of energy, which may be expressed as $CO_2$/kilowatt-hour) for each energy source associated with the grid power source 32, historical averages of emission rates for each energy source, etc. The grid data server 56 may be operated or managed by the utility service provider associated with the grid power source 32 at the location of the vehicle 12 and/or the structure 14.

In another embodiment, the server system 50 includes a weather data server 58 that stores weather related data. The weather related data may include, but is not limited to, weather history including historic weather data, region specific events and storm profiling including types of energy generation typically used for a given locational area, storm metrics including current and forecasted windspeeds, current and forecasted rain fall or snowfall, current and forecasted temperatures, current and forecasted wind loads, current and forecasted sun-loads, current and forecasted barometric pressures, presence and/or likelihood of extreme weather (e.g., heat waves, tornados, hurricanes, heavy snow fall/blizzards, heavy wind, wild fires, torrential rain falls, etc.), etc.

The weather data server 58 may be operated or managed, for example, by an organization such as the national weather service. Alternatively, the weather data server 58 may collect weather/climate related data from weather stations, news stations, remote connected temperature sensors, connected mobile device database tables, etc.

In a first embodiment, a user/owner of the vehicle 12 may interface with the server system 50 for coordinating functions of the vehicle charging system 40 using the HMI 46. For example, the HMI 46 may be equipped with an application 60 (e.g., Sync® or another similar application) for allowing users to interface with the server system 50. The HMI 46 may be located within a passenger cabin of the vehicle 12 and may include various user interfaces for displaying information to the vehicle occupants and for allowing the vehicle occupants to enter information into the HMI 46. The vehicle occupants may interact with the user interfaces presentable on the HMI 46 via touch screens, tactile buttons, audible speech, speech synthesis, etc.

In another embodiment, the user/owner of the vehicle 12 may alternatively or additionally interface with the server system 50 for coordinating functions of the vehicle charging system 40 using a personal electronic device 62 (e.g., a smart phone, tablet, computer, wearable smart device, etc.). The personal electronic device 62 may include an application 64 (e.g., FordPass™ or another similar application) that includes programming to allow the user to employ one or more user interfaces 66 for setting or controlling certain aspects of the vehicle charging system 40. The application 64 may be stored in a memory 68 of the personal electronic device 62 and may be executed by a processor 70 of the personal electronic device 62. The personal electronic device 62 may additionally include a transceiver 72 that is configured to communicate with the server system 50 over the cellular tower(s) 58 or some other wireless link.

The GPS 44 is configured to pinpoint locational coordinates of the vehicle 12. The GPS 44 may utilize geopositioning techniques or any other satellite navigation techniques for estimating the geographic position of the vehicle 12 at any point in time. GPS data from the GPS 44 may be used to determine the grid data and the weather data that is most relevant to the vehicle 12 at any point in time.

The control module 48 may include both hardware and software and could be part of an overall vehicle control system, such as a vehicle system controller (VSC), or could alternatively be a stand-alone controller separate from the VSC. In an embodiment, the control module 48 is programmed with executable instructions for interfacing with and commanding operation of various components of the vehicle charging system 40. Although shown as separate modules within the highly schematic depiction of FIG. 3, the telecommunications module 42, the GPS 44, the HMI 46, and the control module 48 could be integrated together as part of common module of the vehicle 12.

The control module 48 may include a processor 74 and non-transitory memory 76 for executing various control strategies and modes associated with the vehicle charging system 40. The processor 74 may be a custom made or commercially available processor, a central processing unit (CPU), or generally any device for executing software instructions. The memory 76 may include any one or combination of volatile memory elements and/or nonvolatile memory elements. The processor 74 may be operably coupled to the memory 76 and may be configured to execute one or more programs stored in the memory 76 of the control module 48 based on the various inputs received from other devices, such as the server system 50, the telecommunications module 42, the GPS 44, the HMI 46, etc.

In an embodiment, the application 60, which includes programming for allowing the vehicle user to employ one or more user interfaces within the HMI 46 for setting or controlling certain aspects of the vehicle charging system 40, may be stored in the memory 76 and may be executed by the processor 74 of the control module 48. Alternatively or additionally, the control module 48 may be configured to communicate and interface with the personal electronic device 62 for coordinating and/or executing certain aspects of the vehicle charging system 40 through the application 64.

The control module 48 may receive and process various inputs for preparing the ECO charging schedule 88 in order to prioritize the use of renewable/low carbon emission energy sources when charging the vehicle 12. A first input to the control module 48 may include ECO charging mode settings 78. The ECO charging mode settings 78 may be selected/inputted by a user/owner of the vehicle 12 and may include information such as a vehicle range threshold indicating a minimum range (e.g., in miles, kilometers, state of charge percentage, etc.) that the vehicle 12 should be charged to regardless of the availability of renewable/low carbon emission energy sources, a target departure time that establishes the time by which the vehicle 12 needs to be charged to the vehicle range threshold regardless of the amount of energy available from renewable/low carbon emission energy sources, a renewable/low carbon emission energy source threshold indicating the user's desired energy mixture from renewable/low carbon emission energy sources when charging, a desired emission mitigation level or acceptable emissions threshold, user preferences for a specific type(s) of energy source(s), weighting factors assigned to specific types of energy sources, etc.

Another input to the control module 48 may include vehicle information 80 received from various components/subsystems of the vehicle 12. The vehicle information 80 may include information such as the current charging status of the vehicle (e.g., on-plug versus off-plug, current power transfer rate if on-plug, etc.), current state of charge (SOC) of the traction battery pack 16, estimated travel range of the vehicle 12, available bidirectional energy transfer capability of the traction battery pack 16, trip planner information (e.g., expected drive routes planned by the user), etc.

Another input to the control module 48 may include location information 82 received from the GPS 44. The location information 82 may be used to determine appropriate grid data and weather data for the vehicle 12 when preparing the ECO charging schedule 88.

Another input to the control module 48 may include grid information 84 received from the grid data server 56. The grid information 84 may include an identification of each energy source associated with the grid power source 32, real-time energy contributions of each energy source relative to the total energy production of the grid power source 32, emission rate information (e.g., $CO_2$/kilowatt-hour) for each energy source, historical energy production averages of each energy source, etc.

Yet another input to the control module 48 may include weather information 86 received from the weather data server 58. The weather information 86 may include wind, sun-load, and general temperature/weather forecast conditions at the location of the vehicle 12. The weather information 86 may be used by the control module 48 to infer whether or not current weather conditions at the location are favorable or unfavorable for increased energy production of renewable/low carbon emission energy sources, for example.

Based in the various inputs, the control module 48 may be programmed to create the ECO charging schedule 88. The ECO charging schedule 88 may include instructions for when to charge and when not to charge the traction battery pack 16 of the vehicle 12 when it is on-plug based on an amount of renewable/low carbon emission energy being generated by the grid power source 32. For example, the ECO charging schedule 88 may include instructions (e.g., charging protocols, when to being and end charging, etc.) for charging the vehicle 12 when a real-time energy mixture (e.g., a percentage) from renewable/low carbon energy sources exceeds a predefined renewable energy threshold set by the user. The real-time energy mixture may be calculated by dividing the energy mixture sourced from renewable/low carbon emission energy sources by the total energy production of the grid power source 32. The predefined renewable energy threshold can be set at any value by the user of the vehicle 12 or could be preprogrammed by the vehicle manufacturer.

In another embodiment, the ECO charging schedule 88 may include instructions for prioritizing charging of the vehicle 12 at times when a real-time emission rate (e.g., $CO_2$/kilowatt-hour) from the grid power source 32 is less than a predefined maximum acceptable emission rate threshold set by the user. The predefined acceptable emission rate threshold can be set at any value by the user of the vehicle 12 or could be preprogrammed by the vehicle manufacturer.

The ECO charging schedule 88 may further include instructions for charging the vehicle 12 to a predefined level by a predefined or expected departure time. These instructions may include protocols for charging the traction battery pack 16 only to the state of charge necessary for achieving the vehicle range threshold set by the user when the real-time energy mixture from the renewable/low carbon emission energy sources is less than the renewable energy threshold or when the real-time emission rate of the grid power source 32 is greater than the predefined maximum acceptable emission rate threshold.

In another embodiment, the control module 48 may be programmed to quantify the emission rate of each energy source associated with the grid power source 32, and then optimize the predefined threshold for identifying when charging should occur to best minimize emissions as part of preparing the ECO charging schedule 88. For example, the ECO charging schedule 88 may prioritize charging at times that occur when a real-time emission rate of the grid power source 32 drops below a predefined maximum acceptable emission rate threshold that is calculated relative to a long term average emission rate of the grid power source 32. The predefined threshold may therefore be a variable threshold within the scope of this disclosure.

As part of preparing the ECO charging schedule 88, the control module 48 may analyze historical grid data and iteratively determine an optimal emission rate threshold. This threshold would attempt to minimize the emissions over a given period of time, for example the last year, in the geographic location of the vehicle 12, while further ensuring that the vehicle 12 can charge to sufficient level each day. The maximum acceptable emission rate may be a function of historical energy mixture and emissions over a period of time, and historical vehicle use.

When the vehicle 12 is on-plug, the control module 48 may be configured to control charging based on the ECO charging schedule 88. Alternatively, if the vehicle 12 is off-plug, the control module 48 may be configured to command that one or more alerts be communicated to the user/owner of the vehicle 12. The alerts may include routing instructions for routing the user to nearby charging locations that have suitable renewable energy mixtures or emission rates for charging the vehicle 12. The alerts may take the form of one or more messages that can be displayed on the HMI 46 or the personal electronic device 62, for example.

The ECO charging schedule 88 may further indicate times in which it may be advantageous for powering the structure 14 using power from the traction battery pack 16. For example, the control module 48 may control the vehicle 12 to power the structure 14 using energy from the traction battery pack 16 during times in which either the energy mixture from the renewable/low carbon energy sources is less than the renewable energy threshold set by the user or the emission rate is greater than the acceptable emission threshold set by the user and the current vehicle range still exceeds the vehicle range threshold.

In yet another embodiment, if the vehicle 12 is an autonomous vehicle, the ECO charging schedule 88 may include instructions for dispatching the vehicle 12 to travel to one or more renewable/low carbon emission energy sites, controlling the vehicle 12 to harvest renewable energy (e.g., by charging at the renewable energy charging site), and then controlling the vehicle 12 to return to the structure 14 for powering the structure 14 using the harvested renewable energy. This strategy may be particularly useful when the real-time renewable energy mixture available from the grid power source 32 associated with the structure 14 is below the renewable energy threshold or the real-time emission rate of the grid power source 32 is greater than the predefined maximum acceptable emission rate threshold.

Figures 4, 5:
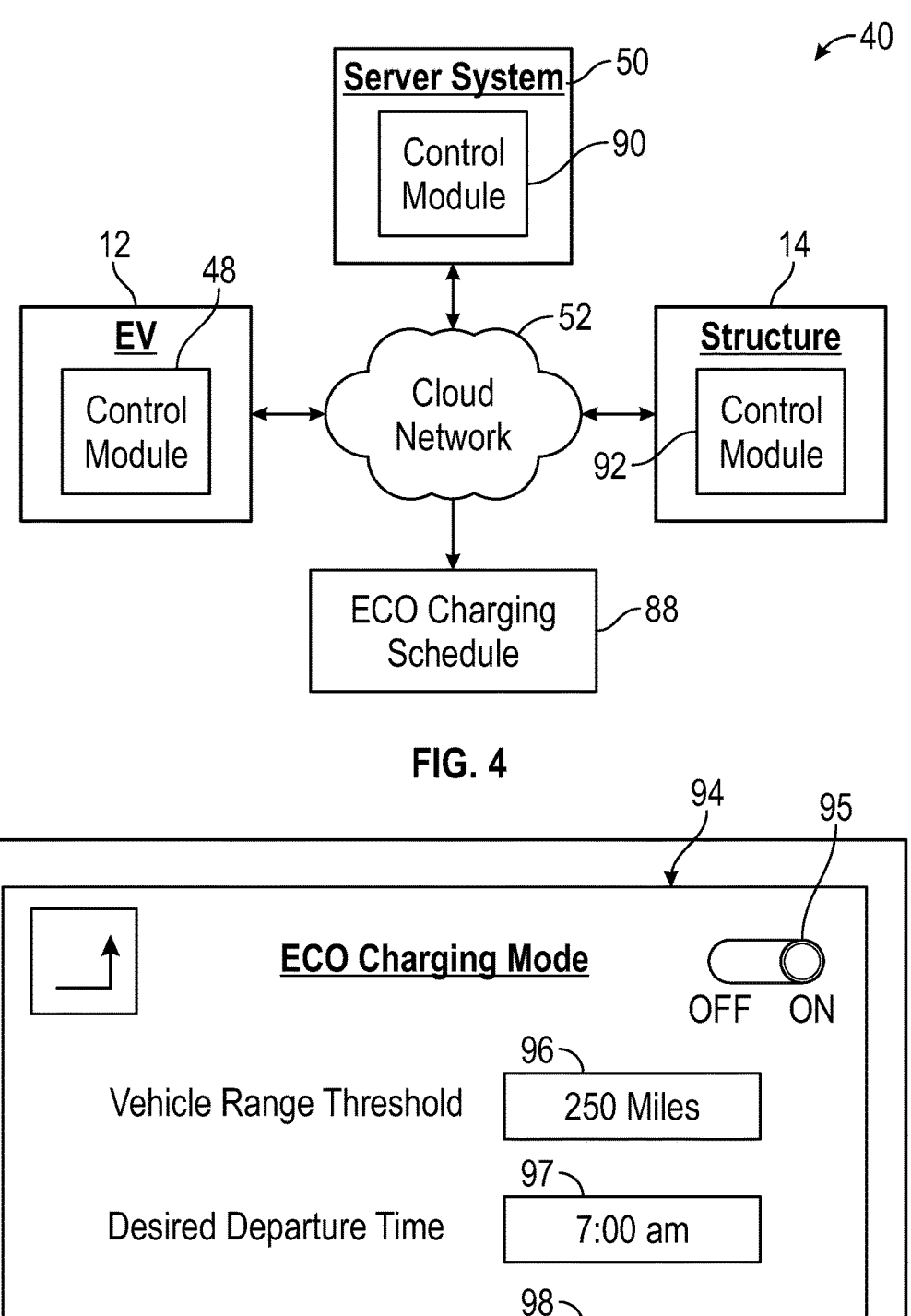
FIG. 4 schematically illustrates another exemplary vehicle charging system.
FIG. 5 schematically illustrates an ECO charging mode user interface.

In the embodiments described above, the control module 48 of the vehicle 12 may be configured to function as the communications hub of the vehicle charging system 40. However, other embodiments are also contemplated within the scope of this disclosure. For example, as shown in FIG. 4, a control module 90 of the server system 50 (e.g., a cloud-based control module) and/or a control module 92 associated with the structure 14 could be configured to function as the communications hub of the vehicle charging system 40. In yet another embodiment, the respective control modules of each of the vehicle 12, the structure 14, and the server system 50 may operate together over the cloud network 52 to establish a control system for controlling the functionality of the vehicle charging system 40, such as for creating the ECO charging schedule 88, for example.

An exemplary user interface 94 that can be presented to the user on the HMI 46 or the personal electronic device 62 for setting/controlling certain aspects associated with the ECO charging mode of the vehicle charging system 40 is schematically illustrated in FIG. 5. A toggle 95 may allow the user to turn the ECO charging mode ON or OFF. When OFF, charging from renewable/low carbon emission sources will not be prioritized.

A first tactile text box 96 of the user interface 94 may be used to input the vehicle range threshold. A second tactile text box 97 may be used to input a desired departure time. A third tactile text box 98 may be used to enter a desired predefined threshold (e.g., renewable energy threshold, maximum acceptable emission rate, etc.). Various other information/prompts may be presented to the user within the user interface 94 within the scope of this disclosure.

Figure 6:
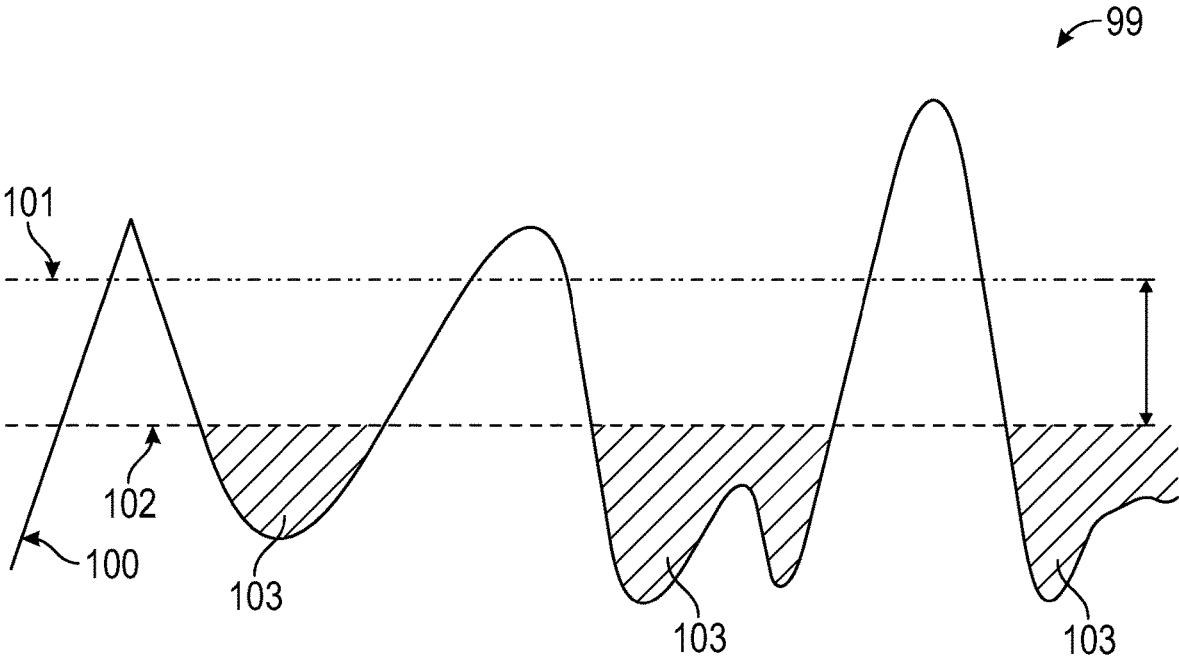
FIG. 6 graphically illustrates an ECO charging mode optimization control strategy.

FIG. 6 schematically illustrates (in graphical form) an ECO mode optimization control strategy 99 that may be executed by the control module 48. A plot of a real-time emission rate 100 of the grid power source 32 may be created based on the grid information 84. The grid information 84 may further be leveraged by the control module 48 for determining a long term average emission rate 101 of the grid power source 32. The control module 48 may also derive a predefined threshold 102 from the ECO charging mode settings 78 for determining when vehicle charging should be prioritized. The control module 48 may prioritize charging of the vehicle 12 to occur when the real-time emission rate 100 falls below the predefined threshold 102. In FIG. 6, the prioritized charging times are schematically indicated by cross-hatched sections 103.

Figure 7:
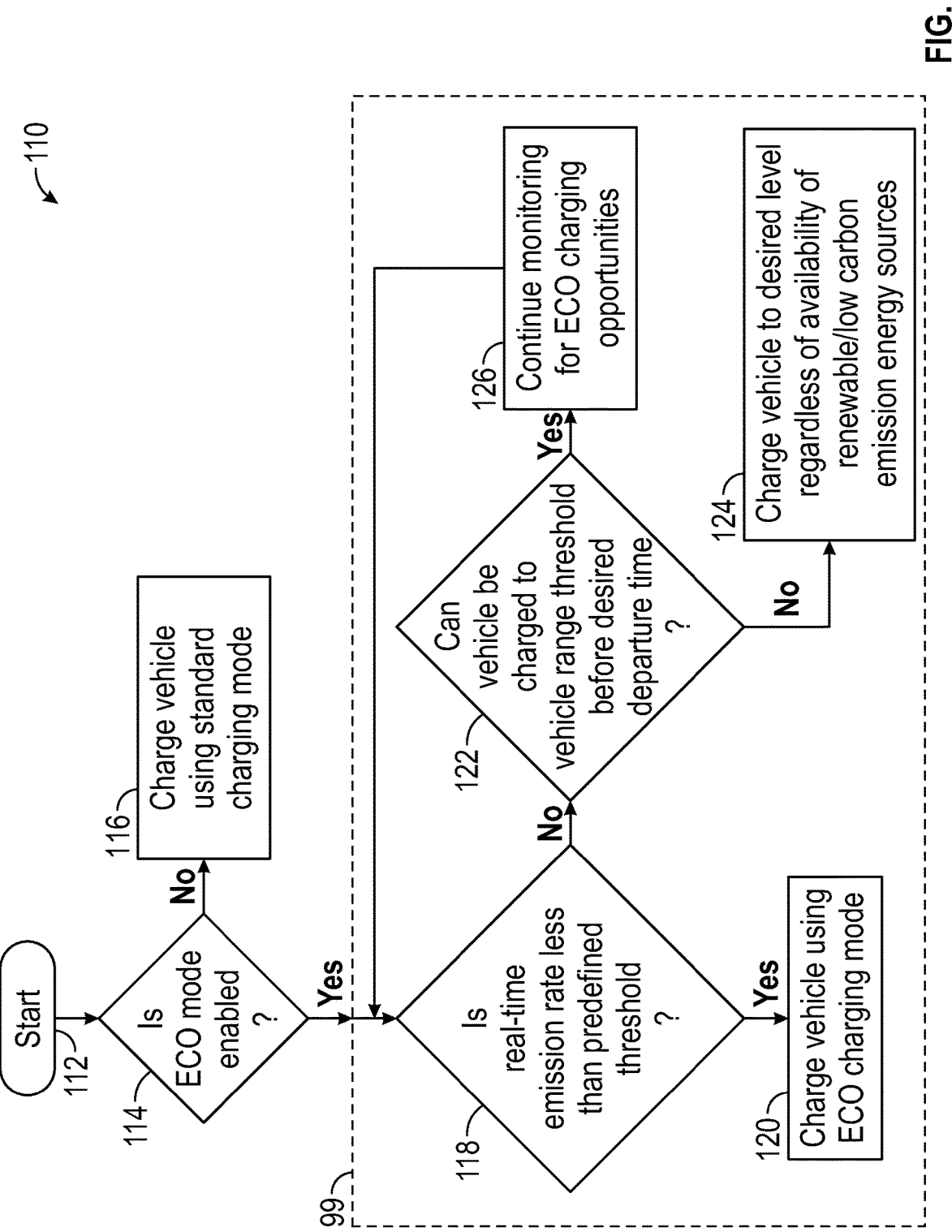
FIG. 7 is a flow chart of an exemplary method for controlling charging of an electrified vehicle in a manner that prioritizes using energy from renewable/low carbon emission sources.

FIG. 7, with continued reference to FIGS. 1-6, schematically illustrates (in flow chart form) an exemplary method 110 for controlling the vehicle charging system 40 in a manner that prioritizes the use of energy from renewable/low carbon emission sources over non-renewable/high carbon emission sources when charging the vehicle 12. The vehicle charging system 40 may be configured to employ one or more algorithms adapted to execute at least a portion of the steps of the exemplary method 110. For example, the method 110 may be stored as executable instructions in the memory 76 of the control module 48, and the executable instructions may be embodied within any computer readable medium that can be executed by the processor 74 of the control module 48. The method 110 could alternatively or additionally be stored as executable instructions in the memories of the control module 90 of the server system 50 and/or the control module 92 of the structure 14.

The exemplary method 110 may begin at block 112. At block 114, the method 110 may determine whether the ECO charging mode is enabled. This may be done by referencing the ECO charging mode settings 78, for example. If a NO flag is returned at block 114, the method 110 may proceed to block 116 by commencing vehicle charging using a standard charging mode. The standard charging mode may be any charging mode that is not configured to prioritize charging using energy from renewable/low carbon emission sources.

Alternatively, if a YES flag is returned at block 114, the method 110 may instead initiate the ECO mode optimization control strategy 99. As part of performing the ECO mode optimization control strategy 99, the control module 48 may receive and analyze various inputs, including but not limited to a desired minimum state of charge/vehicle range level, a desired departure time, a desired emission mitigation threshold, real-time grid usage data with energy source breakdown, an emission rate for each energy source, historical average emission rates, weather forecast at charging location, etc. The ECO mode optimization control strategy 99 may be executed by the control module 48 to create the ECO charging schedule 88.

Execution of the ECO mode optimization control strategy 99 may include the following steps. At block 118, the method 110 may determine whether a real-time emission rate of the grid power source 32 is less than a predefined threshold. If YES, the vehicle 12 may be charged using the ECO charging mode at block 120. Notably, the method 110 assumes that vehicle 12 is on-plug and conditions are suitable for charging.

Alternatively, if a NO flag is returned at block 118, the method 110 may proceed to block 122 by determining whether the vehicle 12 can charge to the vehicle range threshold before the desired departure time. The vehicle range threshold and the desired departure time may be user-defined values that can be derived from the ECO charging mode settings 78. If NO, the method 110 may proceed to bock 124 by charging the vehicle 12 to the desired level irrespective on the amount of energy current available from renewable/low carbon emission sources. If YES, the method 110 may instead proceed to block 126 by continuing to monitor conditions for ECO charging opportunities. The method 110 may thus return to block 118 as part of a continuous, closed loop charging methodology.

The vehicle charging systems of this disclosure are designed to prioritize charging during times in which the amount of energy available from renewable/low carbon emission energy sources exceeds a predefined threshold. The proposed systems/methods are designed to provide increased customer satisfaction, particularly for environmentally conscious vehicle owners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle charging system, comprising:
 a traction battery pack; and
 a control module programmed to prepare an ECO charging schedule for charging the traction battery pack,
 wherein the ECO charging schedule prioritizes using energy from renewable/low carbon emission energy sources over non-renewable/high carbon emission energy sources for charging the traction battery pack,
 wherein the ECO charging schedule is generated based on a user-selected ECO charging mode setting that includes a user selection of at least one of a predefined renewable energy threshold or a predefined maximum acceptable emission rate threshold.

2. The vehicle charging system as recited in claim 1, wherein the ECO charging schedule identifies a time when a real-time energy mixture from the renewable/low carbon emission energy sources exceeds the predefined renewable energy threshold for charging the traction battery pack.

3. The vehicle charging system as recited in claim 2, wherein the real-time energy mixture is derived from grid data received from a cloud-based server system.

4. The vehicle charging system as recited in claim 1, wherein the ECO charging schedule identifies a time when a real-time emission rate of a grid power source is less than the predefined maximum acceptable emission rate threshold for charging the traction battery pack.

5. The vehicle charging system as recited in claim 4, wherein the predefined maximum acceptable emission rate threshold is derived from the user-selected ECO charging mode setting.

6. The vehicle charging system as recited in claim 4, wherein the real-time emission rate is derived from grid data received from a cloud-based server system.

7. The vehicle charging system as recited in claim 1, wherein the control module is further programmed to determine a real-time emission rate and a long term average emission rate of a grid power source as part of preparing the ECO charging schedule.

8. The vehicle charging system as recited in claim 7, wherein the real-time emission rate and the long term average emission rate are derived from grid data obtained from a cloud-based server system.

9. The vehicle charging system as recited in claim 1, wherein the control module is a component of a motor vehicle that is powered by the traction battery pack.

10. The vehicle charging system as recited in claim 1, wherein the ECO charging schedule identifies when the traction battery pack cannot be charged to a predefined vehicle range threshold before a desired departure time.

11. The vehicle charging system as recited in claim 10, wherein the control module is further programmed to control charging of the traction battery pack without prioritizing energy from the renewable/low carbon emission energy sources when the traction battery pack cannot be charged to the predefined vehicle range threshold before the desired departure time.

12. The vehicle charging system as recited in claim 11, wherein the predefined vehicle range threshold and the desired departure time are derived from the user-selected ECO charging mode setting.

13. The vehicle charging system as recited in claim 2, wherein the control module is further programmed to control the traction battery pack to power a residential structure when the real-time energy mixture is below the predefined renewable energy threshold.

14. The vehicle charging system as recited in claim 1, wherein the control module is further programmed to control the traction battery pack to power a residential structure when a real-time emission rate of a grid power source is greater than the predefined maximum acceptable emission rate threshold.

15. The vehicle charging system as recited in claim 1, wherein the control module is further programmed to (1) determine both a real-time emission rate and a long-term average emission rate of a grid power source, and (2) optimize the ECO charging schedule based on a comparison between the real-time emission rate and the long-term average emission rate.

16. The vehicle charging system as recited in claim 1, comprising a user interface configured to receive the user-selected ECO charging mode setting.

17. The vehicle charging system as recited in claim 16, wherein the user interface includes a first tactile text box for inputting a vehicle range threshold, a second tactile text box for inputting a desired departure time, and a third tactile text box for inputting the predefined renewable energy threshold or the predefined maximum acceptable emission rate threshold.

18. The vehicle charging system as recited in claim 1, wherein the ECO charging schedule includes instructions for dispatching a vehicle that comprises the traction battery pack to a charging site having a more favorable renewable energy availability.

19. A method, comprising:
receiving an input of a user-selected ECO charging mode setting that includes a user selection of at least one of a predefined renewable energy threshold or a predefined maximum acceptable emission rate threshold; and
controlling charging of a traction battery pack of a vehicle based on an ECO charging schedule created by a control module of a vehicle charging system,
wherein the ECO charging schedule prioritizes a use of energy from renewable/low carbon emission energy sources over non-renewable/high carbon emission energy sources and is generated based on the user-selected ECO charging mode setting.

20. A vehicle charging system, comprising:
a traction battery pack;
a user interface configured to receive an input of a user-selected ECO charging mode setting for charging the traction battery pack, wherein the user-selected ECO charging mode setting includes a user selection of a predefined renewable energy threshold, a predefined maximum acceptable emission rate threshold, a predefined vehicle range threshold, and a desired departure time;
a control module programmed to prepare an ECO charging schedule for charging the traction battery pack that is generated based on the user-selected ECO charging mode setting, wherein the ECO charging schedule prioritizes using energy from renewable/low carbon emission energy sources over non-renewable/high carbon emission energy sources when charging the traction battery pack; and
the control module is further programmed to automatically disable the ECO charging schedule when the traction battery pack cannot be charged to the predefined vehicle range threshold before the desired departure time.

* * * * *